(12) United States Patent
Nagel et al.

(10) Patent No.: US 11,884,415 B2
(45) Date of Patent: Jan. 30, 2024

(54) AIRBORNE AERODYNAMIC ARRANGEMENT

(71) Applicant: ISRAEL AEROSPACE INDUSTRIES LTD., Lod (IL)

(72) Inventors: Alexander Nagel, Kiryat Ono (IL); Alexander Barladian, Ashdod (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 503 days.

(21) Appl. No.: 16/645,884

(22) PCT Filed: Sep. 3, 2018

(86) PCT No.: PCT/IL2018/050974
§ 371 (c)(1),
(2) Date: Mar. 10, 2020

(87) PCT Pub. No.: WO2019/069302
PCT Pub. Date: Apr. 11, 2019

(65) Prior Publication Data
US 2020/0277074 A1 Sep. 3, 2020

(30) Foreign Application Priority Data
Oct. 3, 2017 (IL) .......................................... 254871

(51) Int. Cl.
*B64D 33/08* (2006.01)
*B64C 21/02* (2006.01)

(52) U.S. Cl.
CPC ............ *B64D 33/08* (2013.01); *B64C 21/025* (2013.01)

(58) Field of Classification Search
CPC .... F02C 7/14; F02C 7/141; F02C 7/18; F02C 7/185; F02C 6/08; B64D 2013/0603; B64D 2013/0607; B64D 2013/0622; B64D 2013/0618; F01D 5/081
See application file for complete search history.

(56) References Cited

U.S. PATENT DOCUMENTS

| | | | |
|---|---|---|---|
| 1,874,278 A * | 8/1932 | Gaines | B64D 15/04 244/203 |
| 3,247,676 A | 4/1966 | Lode | |
| 4,174,083 A * | 11/1979 | Mohn | B64D 33/02 137/15.1 |
| 4,674,704 A | 6/1987 | Altoz et al. | |

(Continued)

*Primary Examiner* — Thuyhang N Nguyen
(74) *Attorney, Agent, or Firm* — BROWDY AND NEIMARK, P.L.L.C.

(57) ABSTRACT

An aerodynamic arrangement and method for providing a required air pressure coefficient at an area of location of an air port of an internal cooling system of a flying platform is described. The air port is selected from an air inlet port and an air outlet port, and arranged at a desired area in an external surface of the flying platform. The aerodynamic arrangement includes at least one airfoil-shaped body arranged on the external surface at the area of the air port for providing a negative pressure coefficient at the corresponding desired area on one side of the airfoil-shaped body and a positive pressure coefficient at the corresponding desired area on the other side of the airfoil-shaped body, when the airfoil-shaped body is oriented at a suitable angle of attack to an oncoming air flow.

19 Claims, 4 Drawing Sheets

(56) References Cited

U.S. PATENT DOCUMENTS

| | | | | |
|---|---|---|---|---|
| 5,203,163 | A * | 4/1993 | Parsons | F02C 6/08 |
| | | | | 60/785 |
| 6,575,402 | B1 | 6/2003 | Scott | |
| 7,861,513 | B2 * | 1/2011 | Stretton | F02K 3/115 |
| | | | | 60/728 |
| 8,490,382 | B2 * | 7/2013 | Zysman | F02K 1/1207 |
| | | | | 60/226.3 |
| 9,415,878 | B2 | 8/2016 | Wetzel | |
| 9,810,147 | B2 * | 11/2017 | Tretow | B64D 13/06 |
| 2009/0178416 | A1 * | 7/2009 | Migliaro | F02K 3/06 |
| | | | | 415/13 |
| 2009/0277993 | A1 | 11/2009 | Storch | |
| 2011/0042518 | A1 | 2/2011 | Da Silva et al. | |
| 2012/0124964 | A1 * | 5/2012 | Hasel | F04D 29/563 |
| | | | | 60/226.3 |
| 2014/0123677 | A1 * | 5/2014 | Allen-Bradley | F01D 5/141 |
| | | | | 416/223 A |

* cited by examiner

AIRBORNE AERODYNAMIC ARRANGEMENT

TECHNOLOGICAL FIELD

This invention relates to an airborne internal air cooling system, and in particular, to providing a required air pressure coefficient at an area of location of an air inlet port and/or an air outlet port of the internal airborne cooling system.

BACKGROUND

An airborne Heating Cooling Ventilation (HCV) system is commonly used to control environmental conditions for airborne avionics and electro-mechanical systems. A typical HCV system utilized in piloting or unmanned aerial vehicles, missiles and other subsonic flying platforms includes an internal air passage, wherein air flowing from the exterior of the flying vehicle is collected by an air inlet port and is then directed to airborne avionic components that can produce a large amount of heat when in operation. The air used for cooling is discharged through an air outlet port.

For effective operation of the airborne cooling system, a pressure gradient should be provided within the HCV system. This can, for example, be achieved by providing a positive pressure coefficient ($Cp>0$) at the air inlet port of the cooling air duct. This condition enhances air pushing into the HCV system. In turn, an effective exhaust of the air from the HCV system requires a negative pressure coefficient ($Cp<0$) at the air outlet port. The pressure gradient must have enough magnitude to provide required air mass flow through the internal air passage of the HCV system.

Various approaches and techniques are known in the art to provide a desired pressure gradient within the air passage. One of the approaches is to find, on the surface of the flying vehicle, locations where the desired characteristics of the pressure coefficient are produced at flight conditions, and to arrange the air inlet port and the air outlet port at these locations, correspondingly. Such locations on flying platforms are known for cooling systems of conventional aviation. However, to locate places with positive and negative pressure coefficients becomes more difficult in the case of autonomous cooling systems mounted within external payloads, such as pods, booms or detachable payloads, which are not integrated with the aircraft's general air cooling system.

Various arrangements are also known in the art for facilitating entrance of the air into the air duct of the cooling systems. For example, arrangements are known that utilize scoops, internal pumps and/or fans arranged at the air inlet and outlet ports. However, such arrangements suffer from complexity, extra energy consumption and weight penalty.

For example, U.S. Pat. No. 3,247,676 describes an arrangement for obtaining a stream of relatively cool air on board an aircraft in flight. The arrangement includes an air inlet on the exterior of the aircraft with an opening facing generally in the direction of relative air flow, and means for drawing air in through said inlet opening.

U.S. Pat. No. 4,674,704 describes a direct air cooling system for electronics carried by aircraft. The cooling system provides a submerged air scoop which directs outside air to several electronic modules. The air flows through passages in the modules which are adjacent to circuit boards bearing discrete electronic components. A foil layer and aluminum fin stock help transfer heat from the electronic components to the directed air.

U.S. Pat. No. 6,575,402 describes a cooling system for a hybrid aircraft. The cooling system includes an inlet which extends through the body to communicate airflow to a powerplant subsystem and out through an exhaust within a rotor duct. In a hover mode, there is a significant low-pressure area created inside the rotor duct by the rotor system. The low-pressure area within the rotor duct assists in drawing air through the inlet and over the engine via the exhaust. A cooling fan is located adjacent the inlet to augment cooling-air flow.

GENERAL DESCRIPTION

Despite prior art in the area of techniques for enhancing operation of cooling systems, there is still a need in the art to provide a novel arrangement that can provide a required air pressure coefficient at a desired area on the external surface of a flying platform. According to the invention, such desired area is in the vicinity of the air inlet port and/or air outlet port of an airborne internal cooling system mounted on a flying platform.

The present invention satisfies the aforementioned needs in the art by providing a novel airborne aerodynamic arrangement for providing a required air pressure coefficient at the areas of location of one or more air ports of an internal cooling system of a flying platform. The air ports are one or more air inlet ports and one or more outlet ports which are arranged at corresponding desired areas in an external surface of the flying platform.

According to an embodiment of the present invention, the aerodynamic arrangement includes one or more airfoil-shaped bodies arranged on the external surface of the platform at the areas of the air inlet port(s) and/or air outlet port(s). Each airfoil-shaped body is configured for providing a negative pressure coefficient at the corresponding desired area on one side of the airfoil-shaped body and a positive pressure coefficient at the corresponding desired area on the other side of the airfoil-shaped body, when the airfoil-shaped body is oriented at a suitable angle of attack to an oncoming air flow.

According to an embodiment of the present invention, the aerodynamic arrangement can provide a required air pressure gradient within the internal air passage between an air inlet port and an air outlet port of an airborne cooling system.

According to an embodiment of the present invention, the airfoil-shaped body is cambered. The side of the airfoil-shaped body, where the negative pressure coefficient is generated, is at least partially convex. According to this embodiment, the other side of the airfoil-shaped body, where the positive pressure coefficient is generated, is also at least partially convex, however it has a curvature less than a curvature of the side where the negative pressure coefficient is generated.

According to an embodiment of the present invention, the other side of the airfoil-shaped body, where the positive pressure coefficient is generated, is either at least partially concave or flat.

According to an embodiment of the present invention, the airfoil-shaped body is located near the air inlet port. The side of the airfoil-shaped body, where the negative pressure coefficient is generated, is directed outwardly from the inlet port. In this case, the inlet port is located in the vicinity of the side where the positive pressure coefficient is generated to provide a positive pressure coefficient in the corresponding desired area of location of the air inlet port when the oncoming air flow bypasses the airfoil-shaped body.

According to an embodiment of the present invention, the side of the airfoil-shaped body, where the negative pressure coefficient is generated, is located near the air outlet port. This size is directed inwardly to the air outlet port to provide a negative pressure coefficient in the corresponding desired area of location of the air outlet port when the oncoming air flow bypasses the airfoil-shaped body.

According to one embodiment of the present invention, the airfoil-shaped body is located above the air inlet port and/or the air outlet port.

According to another embodiment of the present invention, the airfoil-shaped body is located under the air inlet port and/or the air outlet port.

According to an embodiment of the present invention, the arrangement further includes airfoil-shaped body and an air scoop mounted over the air inlet port. The air scoop includes a scoop base attached to the external surface of the flying platform and surrounding the air inlet port. A scoop leading edge forms an inlet scoop opening front-oriented with respect to the direction of the oncoming air flow.

According to an embodiment of the present invention, the arrangement further includes airfoil-shaped body and an air scoop mounted over the air outlet port. In this case, the air scoop includes a scoop base attached to the external surface of the flying platform and a scoop leading edge forming an outlet scoop opening back-oriented with respect to the direction of the oncoming air flow.

According to an embodiment of the present invention, the arrangement further includes airfoil-shaped body and an air louver mounted over the air outlet port. In this case, the air louver forms an outlet opening back-oriented with respect to the direction of the oncoming air flow.

According to an embodiment of the present invention, the airfoil-shaped body is arranged over the air inlet port arranged in the external surface of the platform, and includes an air duct arranged within the airfoil-shaped body. The air duct is coupled to the air inlet port for providing an air passage from the air inlet port to an air duct opening arranged on the side of the airfoil-shaped body where the positive pressure coefficient is generated.

According to an embodiment of the present invention, the airfoil-shaped body is arranged over the air outlet port arranged in the external surface of the platform and includes an air duct arranged within the airfoil-shaped body. The air duct is coupled to the air outlet port for providing an air passage from the air outlet port arranged to an air duct opening arranged on the side of the airfoil-shaped body where the negative pressure coefficient is generated.

According to an embodiment of the present invention, the airfoil-shaped body includes an airfoil-shaped body portion and an aerodynamic deflectable flap portion. The airfoil-shaped body portion includes a rounded leading edge, a sharp trailing edge, an upper surface and a lower surface. According to an embodiment, the airfoil-shaped body portion has a symmetrical shape with a symmetric curvature of the upper surface and the lower surface, however other configurations are also contemplated. The aerodynamic flap portion is pivotally mounted on the trailing edge (i.e. at the rear end) of the airfoil-shaped body portion.

According to an embodiment of the present invention, the airfoil-shaped body has a shape with a rounded leading edge followed by a sharp trailing edge with a symmetric curvature of both sides of the airfoil-shaped body, however other configurations are also contemplated. According to this embodiment, the airfoil-shaped body is rotatably mounted on the surface of the flying platform, and is rotatable to alter the desired angle of attack of orientation of the airfoil-shaped body to the oncoming air flow.

The airborne aerodynamic arrangement of the present invention has many of the advantages of the prior art techniques, while simultaneously overcoming some of the disadvantages normally associated therewith.

The airborne aerodynamic arrangement of present invention allows arranging air inlet or air outlet ports of an internal cooling system at the locations which are most optimal for cooling effectiveness, structure strength and payload functionality.

The airborne aerodynamic arrangement of the present invention does not depend on the type of cooling system and can be used for a broad range of cooling purposes.

The airborne aerodynamic arrangement according to the present invention is mostly helpful when operation of the payload requires effective cooling with minimum energy consumption and within a strictly limited internal volume, and especially when utilization of pumps, air fans or other devices that can provide pressure distribution within a cooling air duct, are not desirable.

The airborne aerodynamic arrangement according to the present invention may be readily conformed to complexly shaped surfaces and contours of a flying platform.

The airborne aerodynamic arrangement according to the present invention may be efficiently manufactured.

The installation of the airborne aerodynamic arrangement to a flying platform is relatively quick and easy and can be accomplished without substantially altering the platform, with which it is to be associated.

The airborne aerodynamic arrangement according to the present invention is of durable and reliable construction.

The present invention also satisfies the aforementioned needs in the art by providing a novel method for providing a required air pressure coefficient at an area of location of at least one air port of an internal cooling system of a flying platform. The air port is selected from an air inlet port and an air outlet port, and arranged at a desired area in an external surface of the flying platform. The method includes providing an airfoil-shaped body on the external surface at the corresponding area of the air port for generating a negative pressure coefficient at the corresponding desired area on one side of the airfoil-shaped body and a positive pressure coefficient at the corresponding desired area on the other side of the airfoil-shaped body, when the airfoil-shaped body is oriented at a suitable angle of attack to an oncoming air flow.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The principles and operation of the aerodynamic arrangement for providing a required air pressure coefficient at an area of location of at least one air port of an internal cooling system of a flying platform according to the present invention may be better understood with reference to the drawings and the accompanying description, it being understood that these drawings and examples in the description are given for illustrative purposes only and are not meant to be limiting. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. The same reference numerals and alphabetic characters will be utilized for identifying those components which are common in the aerodynamic arrangement and its components shown in the drawings throughout the present description of the invention.

Figures 1, 2:
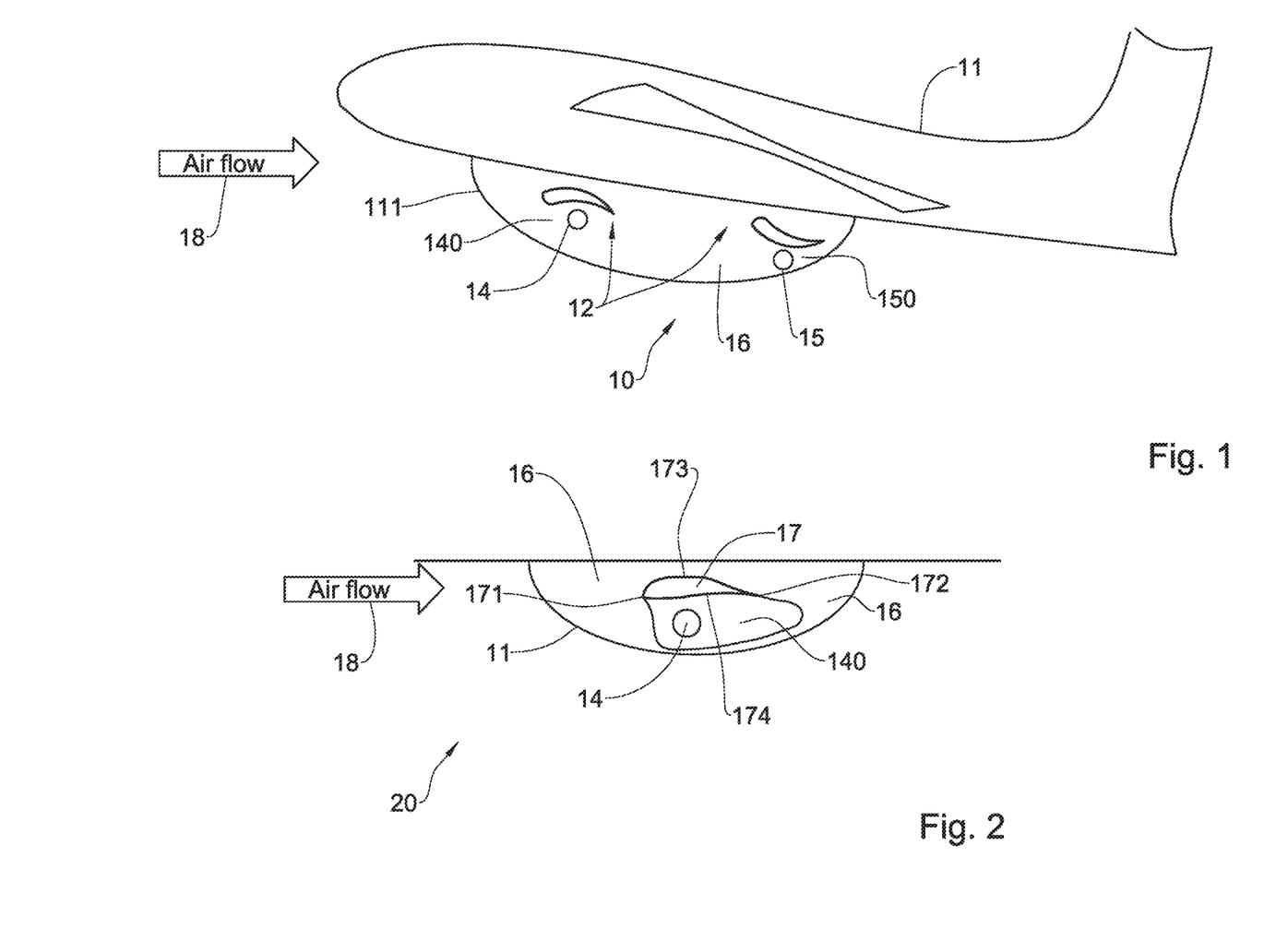
FIG. 1 illustrates a general concept for providing a desired pressure coefficient at an area of location of an inlet and outlet air ports of an internal cooling system of a flying platform.
FIGS. 2 through 10 illustrate examples of configurations of an aerodynamic arrangement for providing a desired pressure coefficient at an area of location of an inlet and outlet air ports on an external surface of the flying platform, according to various embodiments of the present invention.

Referring to FIG. 1, a general concept for providing a desired pressure coefficient at a required location on an external surface 16 of a flying platform 11 is illustrated, according to an embodiment of the present invention. The flying platform 11 has a pod 111 including a payload (not shown). The pod 111 is equipped with an autonomous internal air cooling system 12 arranged within the pod 111. The internal cooling system 12 includes an air inlet port 14 and an air outlet port 15. In operation, air enters at the air inlet port 14 and passes through an internal cooling volume (not shown) of the cooling system 12 to the air outlet port 15 from which the air exits.

The present invention is not bound to any specific implementation of the internal cooling system 12 and can, for example, be used with any known type of a direct air cooling system. The air inlet port 14 and the air outlet port 15 are arranged at corresponding desired areas in an external surface 16 of the pod 111.

The air inlet port 14 and the air outlet port 15 can, for example, be implemented as a single circular orifice or as a plurality of circular orifices located at the corresponding desired areas in the external surface 16 of the pod 111. Likewise, the air inlet and outlet ports 14 and 15 can be implemented as one or more slots. When desired, the air inlet port 14 and the outlet port 15 can be equipped with a corresponding scoop (not shown) or with a louver device (not shown) mounted over the inlet port 14 and the outlet port 15.

It should be noted that the inventive concept of the present invention is not limited to pods or to any other specific components of the flying platform 11. Likewise, the inventive concept of the present invention is not limited to any specific type of the flying platform. It can, for example, be utilized in aircrafts, unmanned aerial vehicles, missiles and other subsonic flying vehicles, which include internal cooling systems with air flowing through an internal volume of the cooling system in order to cool avionics and electro mechanical systems (not shown) of the payload as well as other components that can produce a large amount of heat when in operation.

As described above, for effective operation of the internal cooling system 12, a positive pressure coefficient (Cp>0) should be provided at an area 140 where an air inlet port 14 of the cooling system 12 is located. This condition enhances air suction into the air inlet port 14. In turn, an effective exhaust of the air from the internal cooling system 12 requires a negative pressure coefficient (Cp<0) at an area 150 of the air outlet port 15.

Thus, according to the present invention, an aerodynamic arrangement 10 is used to provide a required positive pressure coefficient at an area 140 of the air inlet port 14 of the internal cooling system 12 employed in the flying platform 11. Likewise, an aerodynamic arrangement 10 is used to provide a required negative pressure coefficient at the area 150 of the air outlet port 15. It should be understood that the internal cooling system 12 may include any desired number of air inlet ports and air outlet ports, and each air port can be equipped with the corresponding aerodynamic arrangement 10.

The aerodynamic arrangement of the present invention can, for example, be used in a subsonic aircraft to cool electronic modules arranged in an airborne pod equipped with an autonomous air cooling system that is not integrated with a main cooling system of the aircraft carrying this airborne pod. A pod equipped with an autonomous internal air cooling system can, for example, be mounted under the fuselage or under the main wings or at any other desired location of an aircraft or any other flying platform. It should be noted that the aerodynamic arrangement 10 of the present invention can also be used in any detachable airborne blocks.

Referring to FIG. 2, an aerodynamic arrangement 20 for providing a desired pressure distribution on an external surface of the flying platform 11 is illustrated, according to an embodiment of the present invention. According to this embodiment of the present invention, the aerodynamic arrangement 20 includes an airfoil-shaped body 17 arranged on the external surface 16 of the flying platform 11 at the area 140 of location of the air inlet port 14.

The airfoil-shaped body 17 may have a substantially rectangular plan profile along an axis (not shown) perpendicular to the external surface 16, however other configurations of the profile along the axis (not shown) perpendicular to the external surface 16 are also contemplated, for example: swept-back or swept forward, with dihedral or anhedral and/or with a variable taper ratio.

The airfoil-shaped body 17 includes a leading edge 171 followed by a trailing edge 172. The airfoil-shaped body 17 also includes a suction surface 173 and a pressure surface 174 extending between the leading edge 171 and the trailing edge 172. The leading edge 171 is the foremost edge of airfoil-shaped body 17 that first contacts an oncoming air flow 18 and splits the air flow 18 into two curved air streamlines. The trailing edge 172 of the airfoil-shaped body 17 is its rear edge, where the airflow split by the leading edge 171 rejoins.

The suction surface 173 and the pressure surface 174 are two opposite surfaces of the airfoil-shaped body 17 between the leading edge 171 and the trailing edge 172. The suction surface 173 is defined as the surface that provides a higher velocity of the bypassing air flow, and a negative pressure coefficient ($C_p<0$) in the vicinity of the suction surface 173 when the airfoil-shaped body 17 is oriented at a suitable angle of attack to the oncoming air flow 18. In turn, the pressure surface 174 is defined as the surface that provides a comparatively lower velocity of the bypassing air flow than the suction surface 173, and a positive pressure coefficient ($C_p>0$) in the vicinity of the pressure surface 174 at a corresponding angle of attack.

The lower pressure properties of the suction surface 173 and the higher pressure properties of the pressure surface 174 are determined by the shape of the airfoil-shaped body 17 and by the orientation of the airfoil-shaped body 17 to the oncoming air flow 18. The desired magnitudes of the pressure coefficient can be achieved in a broad range of the angle of attack (flight envelope).

It should be noted that dimensions of the airfoil-shaped body 17 of the present invention are such that an aerodynamic forces and moments generated by the airfoil-shaped body 17 are negligible when compared with the aerodynamic forces and the moments providing motion of the flying platform 11. In this case, the aerodynamic effect of the airfoil-shaped body 17 does not cause a significant effect on the flying performance of the flying platform 11.

According to an embodiment of the present invention, an area of aerodynamic surface of the airfoil-shaped body 17 does not exceed 2% of the area of a main aerodynamic surface (i.e., a main wing of the flying platform).

According to the embodiment shown in FIG. 2, the airfoil-shaped body 17 has a cambered shape, and is mounted above the air inlet port 14. As shown in FIG. 2, the suction surface 173 is an upper side of the airfoil-shaped body 17, while the pressure surface 174 is a lower side of the airfoil-shaped body 17.

As shown in FIG. 2, the suction surface 173 is convex, while the pressure surface 174 is concave, however, other shape configurations are contemplated, provided that a negative pressure coefficient ($C_p<0$) is generated on the upper side (i.e. on the suction surface 173), while a positive pressure coefficient ($C_p>0$) is generated on the lower side (i.e. on the pressure surface 174) of the airfoil-shaped body when the oncoming air flow bypasses the airfoil-shaped body. It should be noted that in this configuration, the airfoil-shaped body can be oriented even at zero angle of attack to an oncoming air flow 18.

When desired, the pressure surface 174 of the airfoil-shaped body 17 may be flat or even convex, provided that the upper side has a curvature greater than the curvature of the lower side.

The suction surface 173 of the airfoil-shaped body 17 should be directed outwardly from the air inlet port 14 to provide a negative pressure coefficient above the airfoil-shaped body 17 when the oncoming air flow bypasses the airfoil-shaped body 17, and to provide a positive pressure coefficient in the corresponding desired area of location of the air inlet port 14, which is below the airfoil-shaped body 17.

According to the embodiment shown in FIG. 2, the airfoil-shaped body 17 is arranged above the air inlet port 14. Such configuration can protect the internal cooling system from penetration of conduced water droplets presented in the atmospheric air into the air inlet port 14. However, when desired, the airfoil-shaped body 17 can be mounted upside-down, and arranged under the air inlet port 14, mutatis mutandis.

Figure 3:
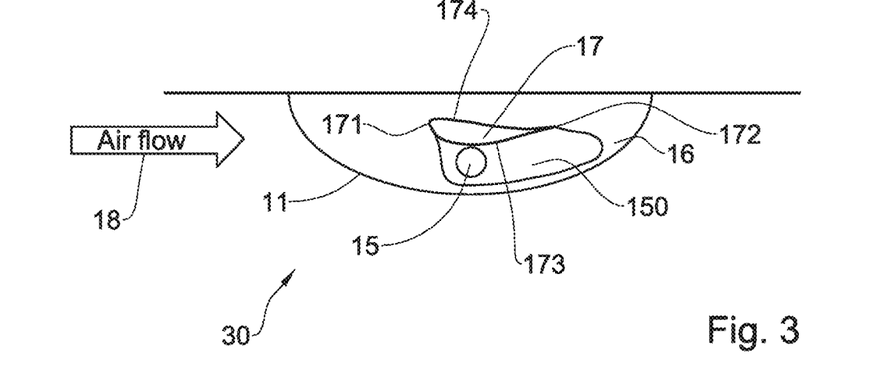

Referring to FIG. 3, an aerodynamic arrangement 30 for providing a required air pressure coefficient at an area of location of an air port of an internal cooling system (not shown) of the flying platform 11 is illustrated, according to another embodiment of the present invention. The aerodynamic arrangement 30 differs from the aerodynamic arrangement 20 shown in FIG. 2 by the fact that the airfoil-shaped body 17 is turned upside-down and arranged on the external surface 16 of the flying platform 11 at the desired area 150 of location of the air outlet port 15.

According to the embodiment shown in FIG. 3, the airfoil-shaped body 17 has a cambered shape, and is mounted above the air outlet port 14. The suction surface 173 of the airfoil-shaped body 17 is located near the air outlet port 15 and is directed inwardly to the air outlet port 15. This provision provides a negative pressure coefficient in the corresponding area 150 of location of the outlet port 15 when the oncoming air flow 18 bypasses the airfoil-shaped body 17.

As shown in FIG. 3, the airfoil-shaped body 17 is arranged above the air outlet port 15 to protect the internal cooling system from penetration of conduced water droplets presented in the atmospheric air into the air outlet port 15. However, when desired, the airfoil-shaped body 17 can be arranged under the air outlet port 15, mutatis mutandis.

Figure 4:
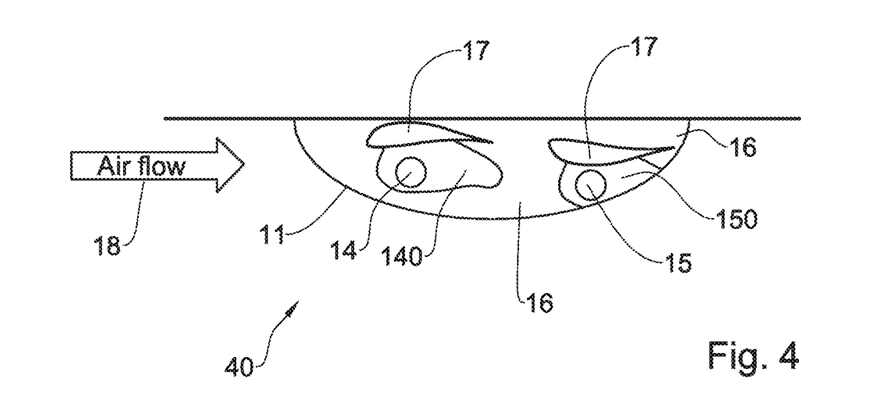

Referring to FIG. 4, an aerodynamic arrangement 40 for providing a required air pressure coefficient at an area of location of air ports of an internal cooling system (not shown) of the flying platform 11 is illustrated, according to a further embodiment of the present invention. According to this embodiment, the aerodynamic arrangement 10 includes two airfoil-shaped bodies 17 arranged on the external surface 16 at both areas 140 and 150 of location of the inlet port 14 (similar to the embodiment shown in FIG. 2) and location of the air outlet port 15 (similar to the embodiment shown in FIG. 3).

Figure 5:
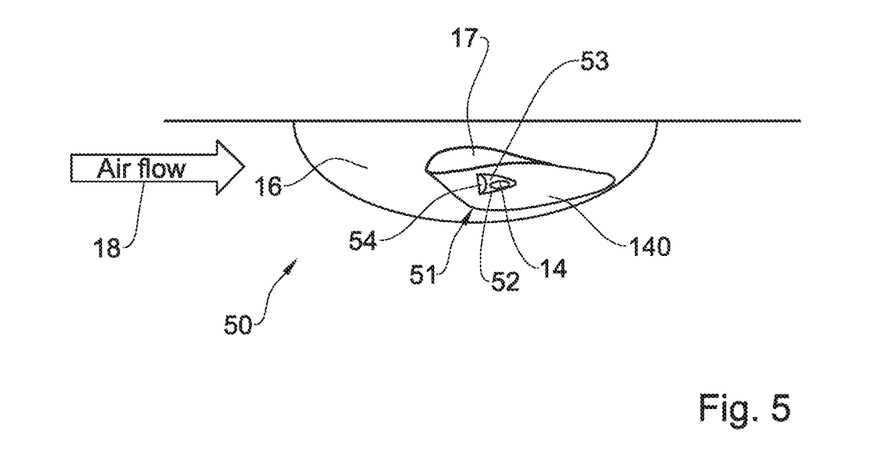

Referring to FIG. 5, an aerodynamic arrangement 50 for providing a required air pressure coefficient at an area of location of an air port of an internal cooling system (not shown) of the flying platform 11 is illustrated, according to yet another embodiment of the present invention. The aerodynamic arrangement 50 differs from the aerodynamic arrangement 20 shown in FIG. 2 by the fact that it further includes an inlet air scoop 51 mounted on the area 140 over the air inlet port 14 and is attached to the external surface 16 of the flying platform 11.

The inlet air scoop 51 is a forward facing air scoop that includes a scoop base 52 attached to the external surface 16 of the flying platform and surrounding the air inlet port 14, and a scoop leading edge 53. The scoop leading edge 53 forms an inlet scoop opening 54. As shown in FIG. 5, the inlet scoop opening 54 is a forward facing inlet that is front-oriented with respect to the direction of the oncoming air flow 18. In operation, the inlet air scoop 51 brings the oncoming air flow 18 from exterior of the flying platform 11 to the air inlet port 14.

The suction surface 171 of the airfoil-shaped body should be directed outwardly from the air inlet scoop 51 to provide a negative pressure coefficient above the airfoil-shaped body 17 and a positive pressure coefficient in the corresponding desired area 140 of location of the air inlet scoop 51 when the oncoming air flow bypasses the airfoil-shaped body 17.

According to this embodiment, the airfoil-shaped body 17 is arranged above the air scoop 51, however, when desired, the airfoil-shaped body 17 can be arranged under the air inlet scoop 51, mutatis mutandis.

Figure 6:
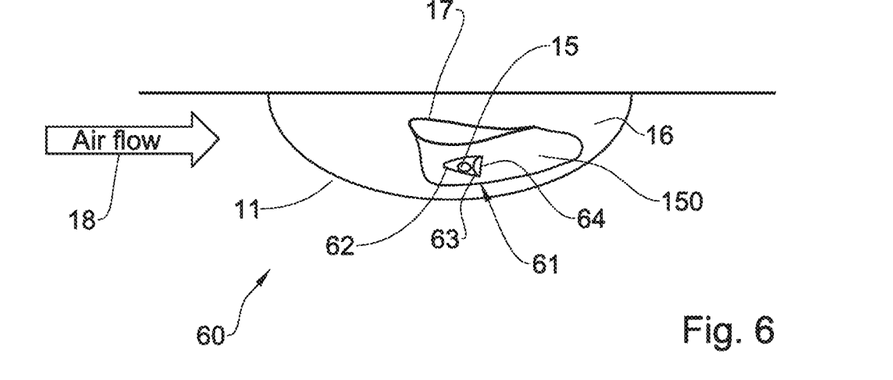

Referring to FIG. 6, an aerodynamic arrangement 60 for providing a required air pressure coefficient at an area of location of an air port of an internal cooling system (not shown) of the flying platform 11 is illustrated, according to still a further embodiment of the present invention. The aerodynamic arrangement 60 differs from the aerodynamic arrangement 50 shown in FIG. 5 by the fact that it includes an outlet air scoop 61 mounted on the area 150 over the air outlet port 15 and is attached to the external surface 16 of the flying platform 11.

The outlet air scoop 61 includes a scoop base 62 attached to the external surface 16 of the flying platform 11 and surrounding the air outlet port 15, and a scoop leading edge 63. The scoop leading edge 63 forms an outlet scoop opening 64. As shown in FIG. 6, the outlet scoop opening 64 is back-oriented with respect to the direction of the oncoming air flow 18. In operation, the outlet air scoop 61 enhances exit of the air flow passing through the cooling air duct (not shown) from the air outlet port 15.

According to the embodiment shown in FIG. 6, the suction surface 171 of the airfoil-shaped body 17 is located above the outlet air scoop 61 and is directed inwardly to the outlet scoop opening 64 of the outlet air scoop 61. This provision provides a negative pressure coefficient in the corresponding area 150 of location of the outlet air scoop 61 when the oncoming air flow 18 bypasses the airfoil-shaped body 17.

As shown in FIG. 6, the airfoil-shaped body 17 is arranged above the outlet air scoop 61, however, when desired, the airfoil-shaped body 17 can be arranged under the outlet air scoop 61, mutatis mutandis.

It should be noted that the aerodynamic arrangement of the present invention may be equipped with an air louver (not shown) instead of the scoop shown in FIG. 6, mutatis mutandis. Thus, according to an embodiment of the present invention, the arrangement includes airfoil-shaped body and an air louver mounted over the air outlet port. In this case, the air louver provides an outlet opening back-oriented with respect to the direction of the oncoming air flow.

Figure 7:
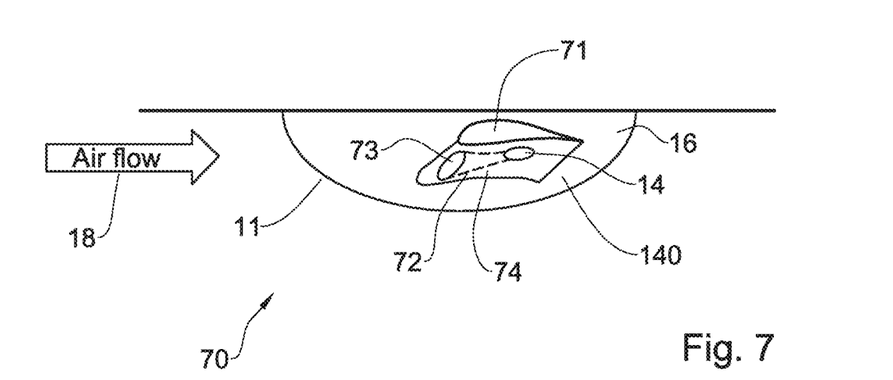

Referring to FIG. 7, an aerodynamic arrangement 70 for providing a required air pressure coefficient at an area of location of an air port of an internal cooling system (not shown) of the flying platform 11 is illustrated, according to still a further embodiment of the present invention. The aerodynamic arrangement 70 includes an airfoil-shaped body 71 arranged on the external surface 16 of the flying platform 11 at the area 140 over the air inlet port 14 arranged in the external surface 16. The airfoil-shaped body 71 differs from the airfoil-shaped body (17 in FIG. 2) by the fact that it includes an air duct 72 (shown by dashed lines) arranged within the airfoil-shaped body 71. The air duct 72 is coupled to the air inlet port 14 and provides an air passage from the air inlet port 14 to an opening 73 arranged on a pressure surface 74 of the airfoil-shaped body 71. Since the opening 73 is located in the area of a positive pressure coefficient, it facilitates ingression of the air into the air duct 72, and then into the cooling system (12 in FIG. 1) through the air inlet port 14.

Figure 8:
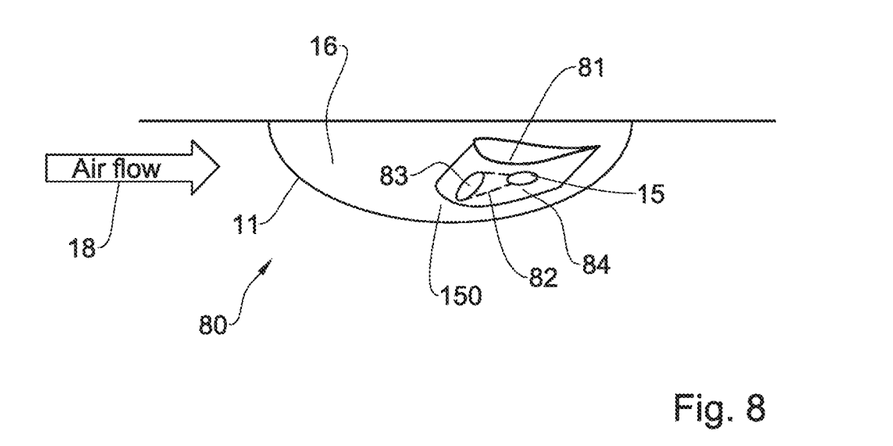

Referring to FIG. 8, an aerodynamic arrangement 80 for providing a required air pressure coefficient at an area of location of an air port of an internal cooling system (not shown) of the flying platform 11 is illustrated, according to still a further embodiment of the present invention. The aerodynamic arrangement 80 includes an airfoil-shaped body 81 arranged on the external surface 16 of the flying platform 11 at the area 150 over the air outlet port 15 arranged in the external surface 16. The airfoil-shaped body 81 differs from the airfoil-shaped body (17 in FIG. 2) by the fact that it includes an air duct 82 arranged within the airfoil-shaped body 81. The air duct 81 is coupled to the air outlet port 15 and provides an air passage from the air outlet port 15 to an opening 83 arranged on a suction surface 84 of the airfoil-shaped body 81. Since the opening 83 is located in the area of a negative pressure coefficient, it facilitates exhaust of the air from the air outlet port 15 through the air duct 82 into the atmosphere.

It should be understood that invention is not bound to a specific shape of the opening 73 in FIG. 7 and the opening 83 in FIG. 8. When desired, the openings 73 and 83 can be configured as a plurality of the perforation orifices. Likewise, the openings 73 and 83 can be configured as chord directional slots oriented in the direction of the main air flow stream or as lateral slots oriented in the direction of a spanwise flow stream.

Figure 9:
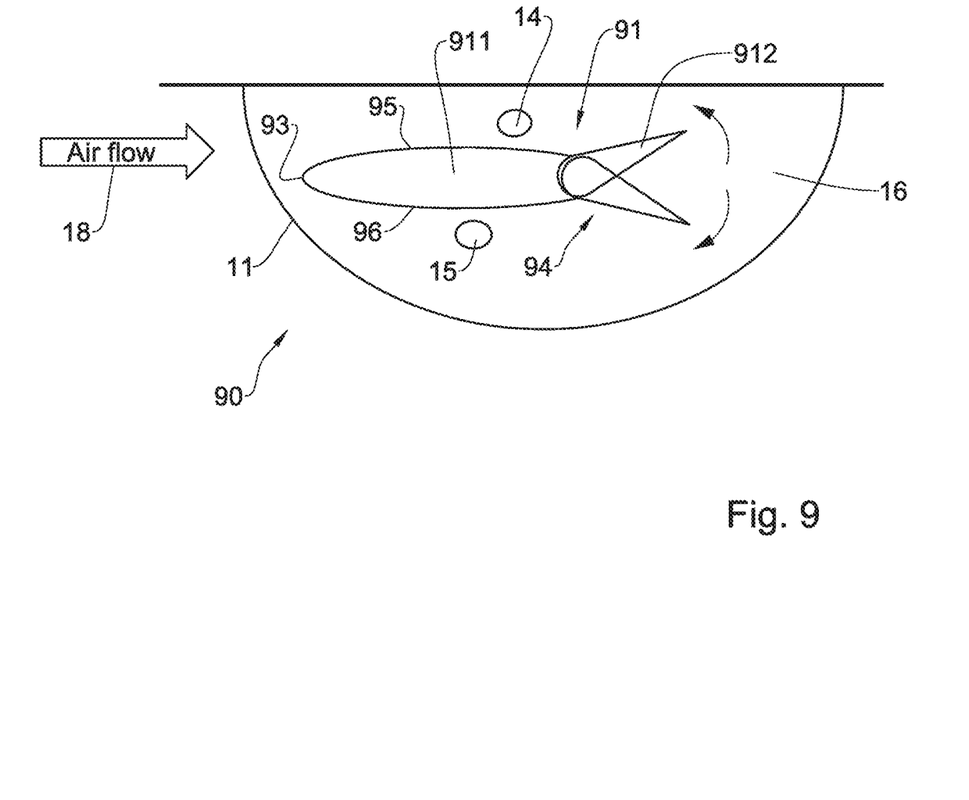

Referring to FIG. 9, an aerodynamic arrangement 90 for providing a required air pressure coefficient at an area of location of an air port of an internal cooling system (not shown) of the flying platform 11 is illustrated, according to still a further embodiment of the present invention. According to this embodiment of the present invention, the aerodynamic arrangement 90 includes an airfoil-shaped body 91 having two portions, such as an airfoil-shaped body portion 911 and an aerodynamic flap portion 912. The airfoil-shaped body portion 911 includes a rounded leading edge 93, a sharp trailing edge 94, an upper surface 95 and a lower surface 96. As shown in FIG. 9, the airfoil-shaped body portion 911 has a symmetrical shape with a symmetric curvature of the upper surface 95 and the lower surface 96. It should be noted that when desired, the airfoil-shaped body portion 911 can, for example, have a cambered shape or any other desired asymmetrical shape.

The aerodynamic flap portion 912 is pivotally mounted on the trailing edge 94 of the airfoil-shaped body portion 91. Shape of the airfoil-shaped body 91 alters when the aerodynamic flap portion 912 deflects up or down. In order to obtain a positive pressure coefficient on and above the upper surface 95 and a negative pressure coefficient on and under the lower surface 96, cambering of the symmetrical airfoil-shaped body 91 can be achieved by deflecting the aerodynamic flap portion 912 up. This configuration of the airfoil-shaped body 91 is suitable for the air inlet port 14 located above the airfoil-shaped body portion 91 and for the air outlet port 15 located under the airfoil-shaped body portion 91.

In turn, in order to obtain a negative pressure coefficient on the upper surface 95 and a positive pressure coefficient on the lower surface 96, the aerodynamic flap portion 92 should be deflected down. This configuration of the airfoil-shaped body 91 is suitable for another case (not shown), when the air inlet port is located under the airfoil-shaped body portion 91 while the air outlet port is located above the airfoil-shaped body portion 91.

Figure 10:
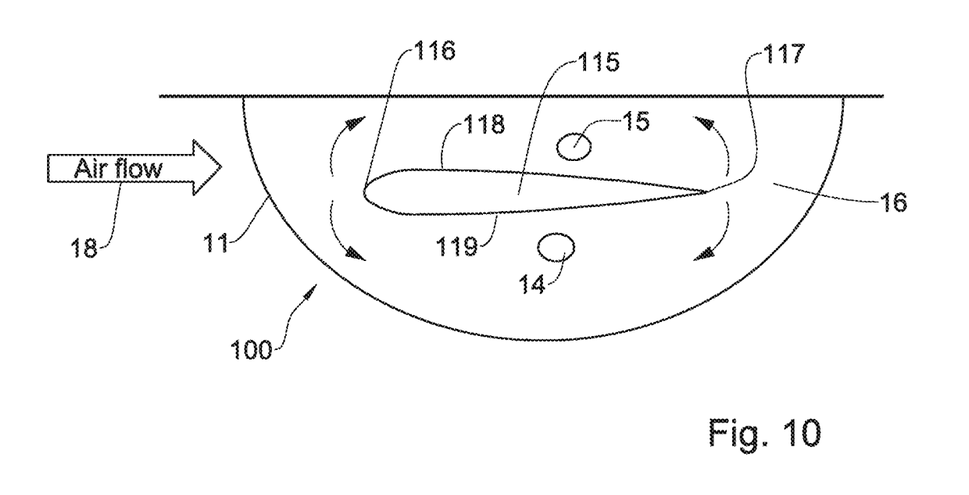

Referring to FIG. 10, an aerodynamic arrangement 100 for providing a required air pressure coefficient at an area of location of an air port of an internal cooling system (not shown) of the flying platform 11 is illustrated, according to still a further embodiment of the present invention. According to this embodiment, the aerodynamic arrangement 110 includes an airfoil-shaped body 115 that is rotatably mounted on a surface of the flying platform 11. The airfoil-shaped body 115 can, for example, be mounted on a shaft (not shown), and is rotatable around the shaft to alter the desired angle of attack of orientation of the airfoil-shaped body to the oncoming air flow.

According to the embodiment shown in FIG. 10, the airfoil-shaped body 115 includes a rounded leading edge 116 followed by a sharp trailing edge 117, an upper surface 118 and a lower surface 119. The airfoil-shaped body 115 has symmetrical shape with a symmetric curvature of the upper surface 118 and the lower surface 119. Therefore, a negative pressure coefficient above the upper surface 118 and a negative pressure coefficient under the lower surface 119 can be achieved by providing a suitable orientation of the airfoil-shaped body 115 to the oncoming air flow 18.

This configuration of the airfoil-shaped body 115 is suitable for the air inlet port 14 located under the airfoil-shaped body portion 115 and for the air outlet port 15 located above the airfoil-shaped body portion 115.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

The present invention is not limited to cooling systems, and the described arrangement can be used for providing a required air pressure at any desired areas on an external surface of a flying platform for any other purposes.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. An aerodynamic arrangement for providing a required air pressure coefficient at an area of location of at least one air port of an internal cooling system of a flying platform,
said at least one air port being selected from an air inlet port and an air outlet port of the internal cooling system, and arranged at a desired area in an external surface of the internal cooling system of the flying platform, wherein said at least one air port opens through the external surface,
the aerodynamic arrangement comprising at least one airfoil-shaped body arranged on the external surface facing an oncoming air flow over the flying platform at the desired area for providing a negative pressure coefficient at the corresponding desired area on one side of the airfoil-shaped body and a positive pressure coefficient at the corresponding desired area on the other side of the airfoil-shaped body when the airfoil-shaped body is oriented at a suitable angle of attack to the oncoming air flow,
wherein said airfoil-shaped body is located near said at least one air port so that the negative pressure coefficient or the positive pressure coefficient created by said airfoil-shaped body near said at least one air port provides an air pressure gradient within the internal cooling system between the air inlet port and the air outlet port to allow the oncoming air flow to flow through the internal cooling system via the air inlet port and the air outlet port.

2. The aerodynamic arrangement of claim 1, wherein said airfoil-shaped body is cambered.

3. The aerodynamic arrangement of claim 2, wherein at least one side of said airfoil-shaped body is convex and has a curvature greater than a curvature of the other side of said airfoil-shaped body, thereby the negative pressure coefficient is generated on said at least one side.

4. The aerodynamic arrangement of claim 3, wherein said airfoil-shaped body is located near the air inlet port, and said at least one side of said airfoil-shaped body is directed outwardly from the inlet port, while the inlet port is located in the vicinity of the other side, where the positive pressure coefficient is generated, to provide the positive pressure coefficient in the corresponding desired area of location of the air inlet port when the oncoming air flow bypasses the airfoil-shaped body.

5. The aerodynamic arrangement of claim 3, wherein said airfoil-shaped body is located near the air outlet port, and said at least one side of said airfoil-shaped body is directed inwardly to the air outlet port to provide the negative pressure coefficient in the corresponding desired area of location of the air outlet port when the oncoming air flow bypasses the airfoil-shaped body.

6. The aerodynamic arrangement of claim 2, wherein said airfoil-shaped body is located above said at least one port selected from said air inlet port and said air outlet port.

7. The aerodynamic arrangement of claim 2, wherein said airfoil-shaped body is located under said at least one port selected from said air inlet port and said air outlet port.

8. The aerodynamic arrangement of claim 1, further comprising an air scoop mounted over said at least one port selected from the air inlet and the air outlet port, and attached to the external surface of the flying platform.

9. The aerodynamic arrangement of claim 8, wherein said at least one port is the air inlet port, and wherein said air scoop includes a scoop base attached to the external surface of the flying platform and surrounding said air inlet port, and a scoop leading edge forming an inlet scoop opening front-oriented with respect to the direction of the oncoming air flow.

10. The aerodynamic arrangement of claim 8, wherein said at least one port is the air outlet port, and wherein said air scoop includes a scoop base attached to the external surface of the flying platform and a scoop leading edge forming an outlet scoop opening back-oriented with respect to the direction of the oncoming air flow.

11. The aerodynamic arrangement of claim 1, wherein said airfoil-shaped body is arranged over said at least one port selected from the air inlet and outlet ports, and includes an air duct arranged within said airfoil-shaped body, the air duct is coupled to said at least one port for providing an air passage from said at least one port to an air duct opening arranged on one side of the airfoil-shaped body.

12. The aerodynamic arrangement of claim 11, wherein said at least one port is the air outlet port and the air duct opening is arranged on said one side of the airfoil-shaped body where the negative pressure coefficient is generated.

13. The aerodynamic arrangement of claim 11, wherein said at least one port is the air inlet port and the air duct opening arranged is arranged on said other side of the airfoil-shaped body where the positive pressure coefficient is generated.

14. The aerodynamic arrangement of claim 1, wherein said airfoil-shaped body includes an airfoil-shaped body portion and an aerodynamic flap portion, said airfoil-shaped body portion including a leading edge, a trailing edge, an upper surface and a lower surface, said aerodynamic flap portion is pivotally mounted on the trailing edge of the airfoil-shaped body portion.

15. The aerodynamic arrangement of claim 14, wherein the airfoil-shaped body portion has a symmetrical shape with a symmetric curvature of the upper surface and the lower surface.

16. The aerodynamic arrangement of claim 1, wherein said airfoil-shaped body has a shape with a rounded leading edge followed by a sharp trailing edge with a symmetric curvature of said one side of the airfoil-shaped body and said other side of the airfoil-shaped body, said airfoil-shaped body is rotatably mounted on the flying platform, and is rotatable to alter the desired angle of attack of orientation of said airfoil-shaped body to the oncoming air flow.

17. The aerodynamic arrangement of claim 1, wherein dimensions of the airfoil-shaped body are such that an aerodynamic forces and moments generated by the airfoil-shaped body are negligible when compared with aerodynamic forces and moments providing motion of the flying platform.

18. The aerodynamic arrangement of claim 1, wherein an area of aerodynamic surface of the airfoil-shaped body does not exceed 2% of an area of a main aerodynamic surface of the flying platform.

19. A method for providing a required air pressure coefficient at an area of location of at least one air port of an internal cooling system of a flying platform, said at least one air port is selected from an air inlet port and an air outlet port of the internal cooling system, and arranged at a desired area in an external surface of the internal cooling system of the flying platform, wherein said at least one air port opens through the external surface, the method comprising:
   providing an airfoil-shaped body on the external surface facing an oncoming air flow over the flying platform at the desired area for generating a negative pressure coefficient at the desired area on one side of the airfoil-shaped body and a positive pressure coefficient at the corresponding desired area on the other side of the airfoil-shaped body when the airfoil-shaped body is oriented at a suitable angle of attack to the oncoming air flow,
   wherein said airfoil-shaped body is located near said at least one air port so that the negative pressure coefficient or the positive pressure coefficient created by said airfoil-shaped body near said at least one air port provides an air pressure gradient within the internal cooling system between the air inlet port and the air outlet port to allow the oncoming air flow to flow through the internal cooling system via the air inlet port and the air outlet port.

\* \* \* \* \*